(12) United States Patent
Koide

(10) Patent No.: US 7,152,499 B2
(45) Date of Patent: Dec. 26, 2006

(54) LEVER APPARATUS FOR VEHICLE

(75) Inventor: Hitoshi Koide, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 377 days.

(21) Appl. No.: 10/445,895

(22) Filed: May 28, 2003

(65) Prior Publication Data
US 2003/0221508 A1 Dec. 4, 2003

(30) Foreign Application Priority Data
Jun. 4, 2002 (JP) ............... P.2002-162937

(51) Int. Cl.
*G05G 1/04* (2006.01)
(52) U.S. Cl. .................................. 74/523
(58) Field of Classification Search .......... 74/523, 74/524; 474/144; 29/453, 463
See application file for complete search history.

(56) References Cited

U.S. PATENT DOCUMENTS

| 5,305,660 A * | 4/1994 | Hasegawa ............... 74/553 |
| 5,385,067 A | 1/1995 | Wiersing et al. .......... 74/484 R |
| 5,681,053 A * | 10/1997 | Misukanis et al. ......... 280/507 |
| 5,775,921 A * | 7/1998 | Chou ..................... 439/21 |
| 6,532,133 B1 * | 3/2003 | Kaneda et al. ............ 360/132 |
| 6,580,419 B1 * | 6/2003 | O'Keeffe et al. .......... 345/163 |

FOREIGN PATENT DOCUMENTS

| DE | 299 19 862 U1 | 2/2000 |
| EP | 0 345 161 | 12/1989 |
| WO | WO 97/15060 | 4/1997 |

* cited by examiner

*Primary Examiner*—Chong H. Kim
(74) *Attorney, Agent, or Firm*—Morgan, Lewis & Bockius LLP

(57) ABSTRACT

Ribs (19) are provided in a lattice pattern on an inner surface of an inclined portion (8) of a level upper (2) making up a first lever component, while first and second projecting portions (28, 29) for press fitting whose cross sections are L-shaped are provided on an inner surface of an inclined portion (12) of a lever lower (3) making up a second lever component. The arrangement provided is such that the first and second projecting portions (28, 29) for press fitting are respectively inserted into first and second inserting portions (22, 23) formed by the ribs (19).

5 Claims, 4 Drawing Sheets

LEVER APPARATUS FOR VEHICLE

SUMMARY OF THE INVENTION

The present invention relates to a lever apparatus for a vehicle for forming a hollow lever by causing a first lever component and a second lever component respectively extending in the longitudinal direction to be connected to each other by fitting the first lever component and the second lever component in an opposing state.

In a lever apparatus for a vehicle of this type, as the means for connecting a first lever component and a second lever component by fitting them in an opposing state, it has hitherto been the commonplace practice to use screws or an arrangement in which an engaging pawl is provided on one component and an engaging hole or an engaging recess for engaging that engaging pawl is provided in the other component.

However, in the case where the screws are used, there are drawbacks in that the screws are required as separate parts, and that a large number of assembling steps is involved, leading to higher cost. In addition, in the case where engaging portions based on engaging pawls are used in a large number, when the engaging holes or the engaging recesses are molded, simple mold releasing cannot be effected, i.e., the so-called undercut structure is adopted, so that the mold structure becomes complex. Therefore, there is a drawback in that the cost becomes high.

SUMMARY OF THE INVENTION

The invention has been devised in view of the above-described circumstances, and its object is to provide a lever apparatus for a vehicle which, in fitting and connecting the first and second lever components, makes it possible to minimize the number of screws or engaging portions based on the engaging pawls, leading to a reduction in cost.

To attain the above object, there is provided a lever apparatus for a vehicle for forming a hollow lever by causing a first lever component and a second lever component respectively extending in the longitudinal direction to be connected to each other by fitting the first lever component and the second lever component in an opposing state, characterized in that ribs are provided in an intersecting pattern on an inner surface of the first lever component, and that a projecting portion for press fitting which is inserted between the ribs in a press-fitted state is provided on an inner surface of the second lever component.

In order to solve the aforesaid object, the invention is characterized by having the following arrangement.

First Aspect

A lever apparatus for a vehicle comprising:

a first lever component and a second lever component to be connected each other in an opposing state to form a hollow lever;

a plurality of ribs provided in an intersecting pattern on an inner surface of the first lever component;

a projecting portion for press fitting to be inserted between the plurality of ribs in a press-fitted state, provided on an inner surface of the second lever component.

Second Aspect

The lever apparatus according to the first aspect, wherein the plurality of ribs are provided in a lattice pattern on the inner surface of the first lever component.

Third Aspect

The lever apparatus according to the first aspect, wherein the projecting portion has a shape capable of face contact with the at least two ribs.

Fourth Aspect

The lever apparatus according to the third aspect, wherein the shape of the projecting portion is an L-shape.

Fifth Aspect

The lever apparatus according to the fourth aspect, wherein at least two of the projecting portions having the L-shape are provided on the inner surface of the second lever component, and a direction of each L-shape is different from each other.

DETAILED DESCRIPTION OF PREFERRED EMBODIMENTS

Hereafter, a detailed description will be given of an embodiment of the invention.

Figure 4:
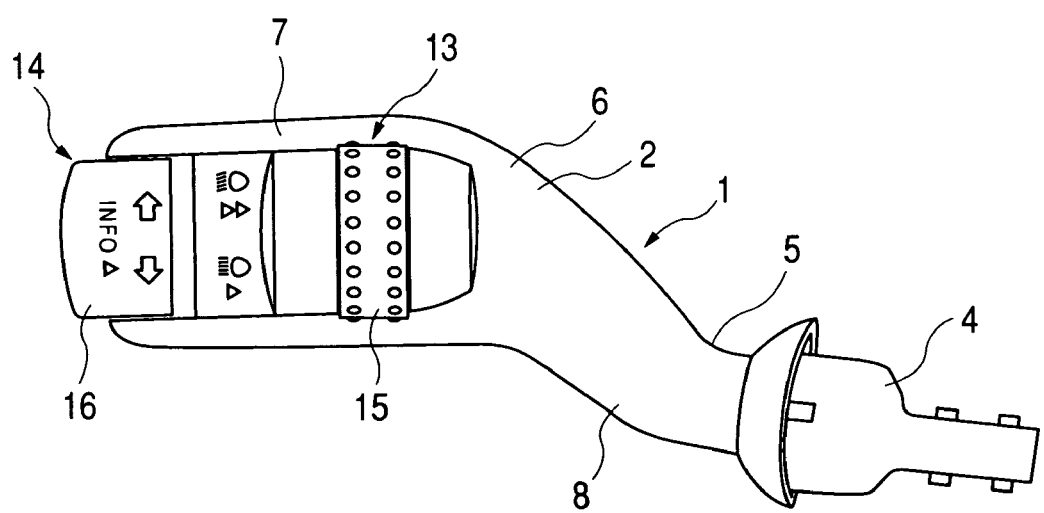
FIG. 4 is a front elevational view of the lever apparatus.
Figure 5:
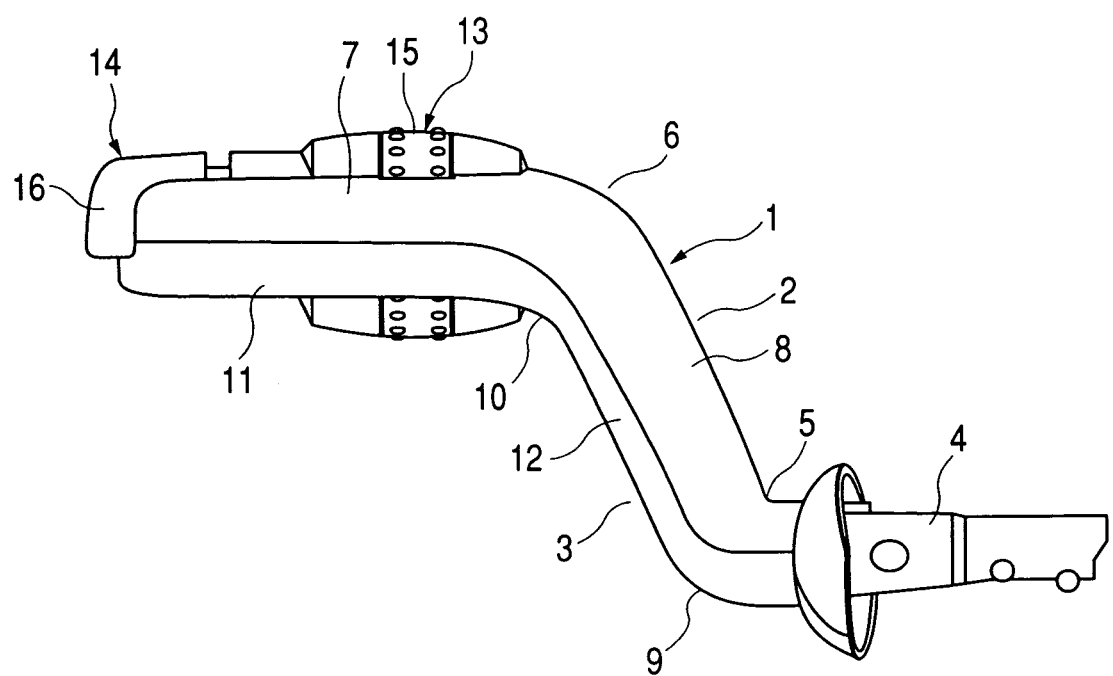
FIG. 5 is a bottom view of the lever apparatus.

First, FIGS. 4 and 5 show an overall structure of a lever apparatus. This lever apparatus is provided on a steering column portion of an unillustrated automobile (vehicle). A lever 1 of this lever apparatus is constructed in a hollow shape as a lever upper 2 and a lever lower 3 respectively extending in the longitudinal direction are connected to each other by being fitted in an opposing state. In this case, the lever upper 2 constitutes a first lever component, and the lever lower 3 constitutes a second lever component.

The lever upper 2 has an attaching portion at a proximal end portion (a right-hand portion in FIGS. 4 and 5) which is one end portion, and has first and second bent portions 5 and 6 in its longitudinally midway portions. A distal end portion side of the second bent portion 6 is formed as a switch installing portion 7, and a portion between the first bent portion 5 and the second bent portion 6 is formed as an inclined portion 8.

In addition, the lever lower 3 also has first and second bent portions 9 and 10 in its longitudinally midway portions in correspondence with the lever upper 2. A distal end portion side of the second bent portion 10 is formed as a switch installing portion 11, and a portion between the first-bent portion 9 and the second bent portion 10 is formed as an inclined portion 12.

In addition, in this case, a display select switch 13 for information is provided between the switch installing portion 7 of the lever upper 2 and the switch installing portion 11 of the lever lower 3, and a reset/set switch 14 is also provided therebetween. In this case, the display select switch 13 is constituted by a one-way rotary switch whose unillustrated switching element is changed over on the basis of the operation of a rotary knob 15 which can be rotatively operated only in one direction. Further, the reset/set switch 14 is constituted by a pushbutton switch whose switching element is changed over on the basis of the pressing operation of a pushbutton 16.

Figure 1:
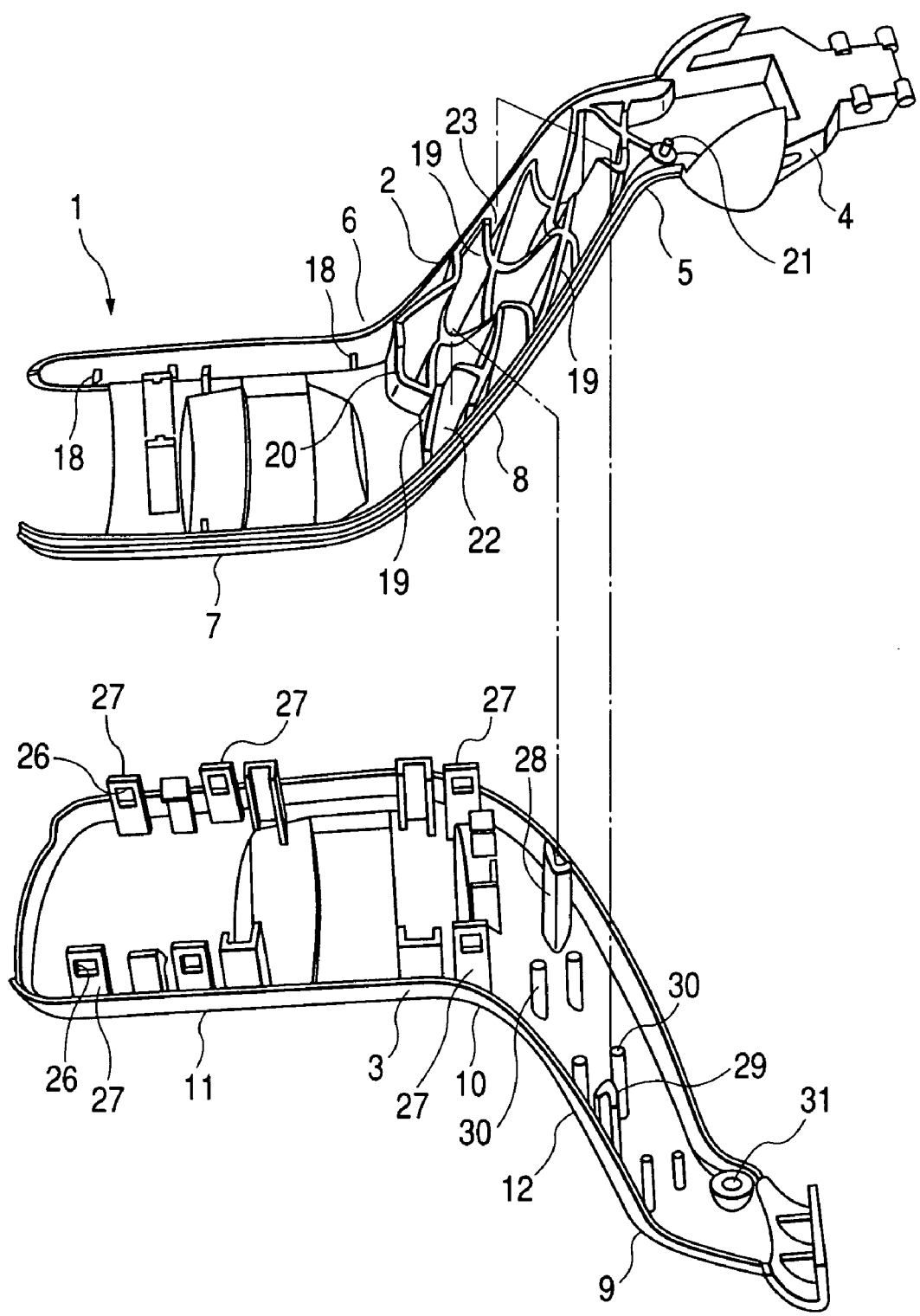
FIG. 1 is an exploded perspective view of a lever illustrating an embodiment of the invention.
Figure 2A:
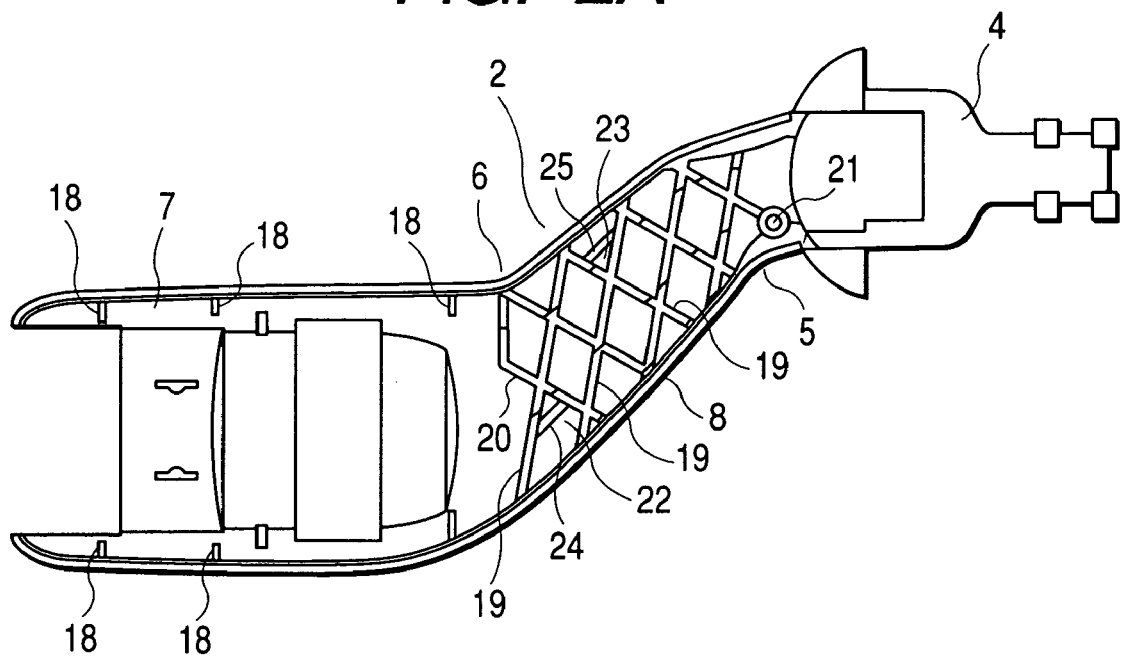
FIG. 2A is a plan view illustrating an inner surface side of a lever upper.

Next, a description will be given of the structure for connecting the above-described lever upper 2 and lever lower 3. In FIGS. 1 and 2A, a plurality o inwardly projecting engaging pawls 18 are projectingly provided on both side portions of the inner surfaces of the switch installing portion 7 in the lever upper 2. Further, on the inner surface of the inclined portion 8, a plurality of ribs 19 are provided over the substantially entire portion of the inclined portion 8 in an intersecting pattern or in a lattice pattern in this case. Recessed lead-wire routing portions 20 are respectively formed in the ribs 19 in such a manner as to extend along the longitudinal direction of the inclined portion 8. The arrangement provided is such that unillustrated lead wires of the aforementioned switches 13 and 14 can be routed here. Further, a projecting portion 21 for fitting is projectingly provided on the inner surface in the vicinity of the first bent portion 5 at a position close to a side portion thereof.

Of the plurality of the recessed portions formed by the lattice-shaped ribs 19, one close to one side portion in the vicinity of the second bent portion 6 is set as a first inserting portion 22. Meanwhile, the recessed portion located midway between the first bent portion 5 and the second bent portion 6 and close to the side portion opposite to side portion where the first inserting portion 22 is located is set as a second inserting portion 23. Low-height ribs 24 and 25 for low portions are provided at portions corresponding to bottoms of these first and second inserting portions 22 and 23.

Figure 2B:
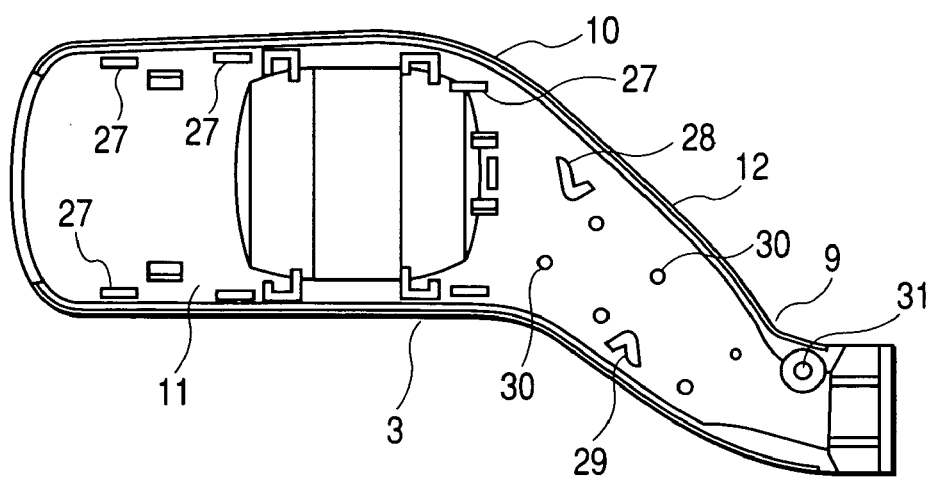
FIG. 2B is a plan view illustrating an inner surface side of a lever lower.

In contrast, as shown in FIGS. 1 and 2B, a plurality of engaging ribs 27 having engaging holes 26 for engaging the aforementioned engaging pawls 18 are projectingly provided on both side portions on the inner surfaces of the switch installing portion 11 in the lever lower 3 at a plurality of positions corresponding to the engaging pawls 18. A first projecting portion 28 for press fitting, which is inserted into the aforementioned first inserting portion 22, is projectingly provided on the inner surface of the inclined portion 12 in such a manner as to be located in the vicinity of the second bent portion 10. Further, a second projecting portion 29 for press fitting, which is inserted into the aforementioned second inserting portion 23, is projectingly provided in such a manner as to be located midway between the first bent portion 9 and the second bent portion 10. Furthermore, a plurality of cylindrical lead wire guides 30 are projectingly provided. In addition, a recessed portion 31 for fitting, which is fitted to the projecting portion 21 for fitting, is provided close to the side portion on the inner surface in the vicinity of the first bent portion 9. In this case, cross sections of the first projecting portion 28 for press fitting and the second projecting portion 29 for press fitting are both formed in an L-shape.

Here, the lever apparatus of the above-described construction is assembled as follows. First, the display select switch 13 and the reset/set switch 14 are assembled to the switch installing portion 11 of the lever lower 3. Then, the lever upper 2 is fitted to the lever lower 3 in an opposing state. Specifically, the plurality of engaging pawls 18 are engaged in the engaging holes 26 of the engaging ribs 27, the first and second projecting portions 28 and 29 for press fitting are inserted into the first and second inserting portions 22 and 23 in a press-fitted state, and the projecting portion 21 for fitting is fitted to the recessed portion 31 for fitting.

Figure 3:
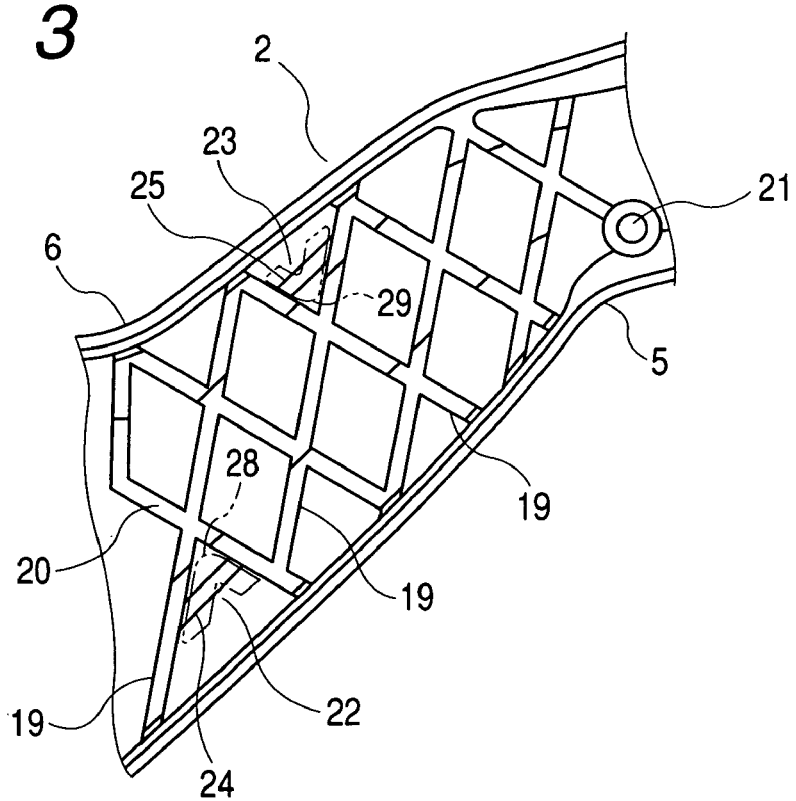
FIG. 3 is an enlarged plan view of essential portions of the lever upper.

Consequently, in a state in which both switches 13 and 14 are accommodated in both switch installing portions 7 and 11, the lever upper 2 and the lever lower 3 are connected in a state of being prevented from coming off. At this time, as shown by the two-dot chain lines in FIG. 3, the first and second projecting portions 28 and 29 for press fitting are set in a state in which they are respectively brought into pressure contact (face contact) with the surfaces of the two adjacent ribs 19 in the corresponding first and second inserting portions 22 and 23. Thus, as the first and second projecting portions 28 and 29 for press fitting are respectively brought into pressure contact with the corresponding first and second inserting portions 22 and 23, it is possible to prevent the positional offset of the lever upper 2 and the lever lower 3 in their lateral direction (in the direction perpendicular to the fitting direction). In addition, the frictional force acting between the first and second projecting portions 28 and 29 for press fitting and the ribs 19 makes it possible to prevent the lever upper 2 and the lever lower 3 from becoming disengaged.

According to the above-described embodiment, it is possible to obtain the following effects. Namely, the arrangement provided is such that the first and second projecting portions 28 and 29 for press fitting are respectively fitted in a press-fitted state into the first and second inserting portions 22 and 23 formed by the ribs 19 in the intersecting state. Therefore, it becomes possible to reduce the number of screws for connection or engaging portions based on the engaging pawls 18, or disuse them.

In addition, the ribs 19 in the intersecting state and the first and second projecting portions 28 and 29 for press fitting respectively extend in the mold releasing direction at the time of molding the lever upper 2 and the lever lower 3, and are so structured as to permit fabrication with a simple mold releasing structure. For this reason, as compared with the case where engaging portions based on the engaging pawls 18 having the undercut structure are used in a large number, it becomes possible to simplify the mold structure, leading to a reduction in cost.

Moreover, since the aforementioned ribs 19 are provided in a lattice pattern on the inner surface of the lever upper 2, an advantage is offered in that the strength of the lever upper 2 can be improved.

Further, since each projecting portion orients in a direction different from one another, i.e., L-shape of each projecting portion orients in direction different from one another, connecting force between the first and second lever components can be enhanced.

The invention is not limited to the above-described embodiment, and can be modified or expanded as described below.

The shapes of the projecting portions 28 and 29 for press fitting are not limited to the L-shape, and may be crisscross or cylindrical.

The ribs 19 may be provided on the lever lower 3, while the projecting portions 28 and 29 for press fitting may be provided on the lever upper 2.

As is apparent from the foregoing description, in accordance with the invention, the arrangement provided is such that, of the first and second lever components making up the lever, ribs are provided in an intersecting pattern on an inner surface of the first lever component, and a projecting portion for press fitting which is inserted between the ribs in a press-fitted state is provided on an inner surface of the second lever component. Therefore, an outstanding advantage is offered in that, in fitting and connecting the first and second lever components, it is possible to minimize the number of screws or engaging portions based on the engaging pawls, leading to a reduction in cost.

What is claimed is:

1. A lever apparatus for a vehicle comprising:
a first lever component and a second lever component to be connected to each other in an opposing state to form a hollow lever;
a plurality of ribs intersecting each other and extending within an inner surface of the first lever component, forming a plurality of inserting portions;
each of the plurality of inserting portions being defined between a respective intersecting portion of the ribs;
a plurality of projecting portions provided on an inner surface of the second lever component,
wherein the plurality of projecting portions of the second lever component are inserted in a press-fitted state against the respective inserting portions of the first lever component.

2. The lever apparatus according to claim 1, wherein the plurality of ribs are provided in a lattice pattern on the inner surface of the first lever component.

3. The lever apparatus according to claim 1, wherein the projecting portion has a shape capable of face contact with the at least two ribs.

4. The lever apparatus according to claim 3, wherein the shape of the projecting portion is an L-shape.

5. The lever apparatus according to claim 4, wherein
at least two of the projecting portions having the L-shape are provided on the inner surface of the second lever component, and
a direction of each L-shape is different from each other.

* * * * *